S. B. NEWBERRY.
PROCESS OF RECOVERING ALKALIS FROM CEMENT MATERIALS.
APPLICATION FILED APR. 11, 1916.

1,239,616. Patented Sept. 11, 1917.

UNITED STATES PATENT OFFICE.

SPENCER B. NEWBERRY, OF BAYBRIDGE, OHIO.

PROCESS OF RECOVERING ALKALIS FROM CEMENT MATERIALS.

1,239,616.   Specification of Letters Patent.   Patented Sept. 11, 1917.

Application filed April 11, 1916.   Serial No. 90,485.

*To all whom it may concern:*

Be it known that I, SPENCER B. NEWBERRY, a citizen of the United States, residing at Baybridge, Erie county, State of Ohio, have invented certain new and useful Improvements in Processes of Recovering Alkalis from Cement Materials, of which the following is a specification.

It is well known, as fully set forth in United States Letters Patent Nos. 1,121,532 and 1,150,295, issued to me on December 15, 1914 and August 17, 1915, respectively, that in the process of burning Portland cement in rotary kilns a large part of the alkalis, potash and soda, contained in the raw materials, is volatilized and carried out of the kiln with the stack gases. This alkali, in the hottest zone of the kiln, is undoubtedly in a free state as alkali-metal oxid and therefore water-soluble. On passing to the cooler part of the kiln, a large part of the alkali comes into contact with the dust particles suspended in the gases; consisting of carbonate of lime and clay, and combines and fluxes with this dust forming silicates of lime, alkali and alumina, similar to glass in composition, which are insoluble in water. It is found, therefore, that while the dust, which may by suitable devices be collected from the stack gases, contains a high percentage of alkali this is, for the most part, insoluble in water and thus not available for fertilizing purposes. For example, if the cement raw mixture contains one per cent. of alkali, the dust collected from the gases may contain ten per cent. or more, of which often only from one to four per cent. is soluble in water. It is also found that not more than one-fourth or one-fifth of the total potash contained in the raw material is retained in the cement clinker, the balance being concentrated in the dust which may be recovered from the stack gases. It is possible to separate the small amount of soluble alkali from this dust by leaching it with water and to return the residue to the kiln, and thus eventually to recover most of the volatilized alkali in water-soluble form. A process, however, by which the total alkali in the dust could be rendered water-soluble and separated from the insoluble matter of the dust would be much less complicated than treatment of the dust with water.

I have found that this can be accomplished by molding the dust into cakes or blocks of comparatively small size and reburning these cakes or blocks of dust in a small vertical kiln of special design, using as fuel coal or coke introduced with the charge of material, provided with a device for automatically discharging the clinker produced, and means for condensing volatile products, operated under a strong pressure of air introduced below the clinker discharge. It is well known that the vertical kilns formerly employed for cement burning, operated by natural draft and charged with large bricks or blocks of raw material, were very costly to construct and slow in operation. By molding the material into small blocks, for example 1 or 2 inches square and 3 or 4 inches long, and introducing air under sufficient pressure, for example 5 to 20 pounds per square inch, to overcome the resistance offered by this compact charge, the time of burning is much diminished and the output of the kiln greatly increased. I find also that the strong blast of hot gases in the vertical kiln operated with high air pressure drives off practically all the alkali from the material, so that clinker burned in this manner contains scarcely a trace of potash. Clinker from the rotary kilns, on the other hand, usually retains from one-fifth to one-fourth of the alkali contained in the raw material. I find that the evolution of alkali in rotary kilns can be made much more complete by providing the kiln with a ring of fire brick inside the lining at the discharge end; this has the effect of holding back the clinker so as to keep it a much longer time in the zone of high heat, without diminishing the output of the kiln.

The means for condensing the alkalis evolved at the top of the kiln are extremely simple, and consist only of flues or chambers in which the kiln gases are brought into contact with cool surfaces, consisting of pipes or partitions cooled by circulation of air or water. The kiln gases carry practically no dust, and the alkali contained in them is precipitated on cooling to somewhat below a red heat. The condensed alkali is collected chiefly in the form of carbonate with more or less sulfate and chlorid according to the amount of chlorin or sulfur in the charge, and is practically completely soluble in water. Under favorable conditions a product may thus be obtained which contains 50 to 60 per cent. of water-soluble potash. It is, of course, understood that the alkali vapors from the vertical kiln may be condensed and collected by sprays of water, in the form of solution, as described in my Patents Nos. 1,121,532 and 1,150,295, without departing from the essential features of this invention.

In the accompanying drawing the essential features of the invention are illustrated.

Figure 1:
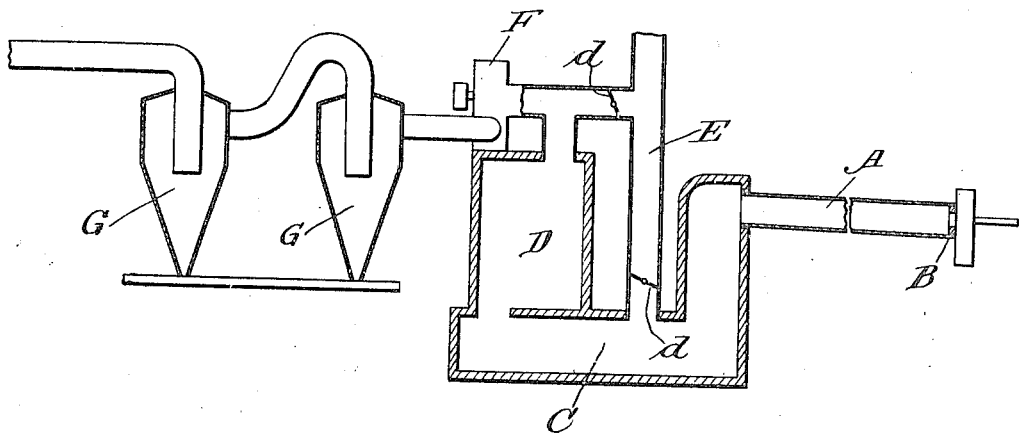
Figure 1 is a more or less diagrammatic, sectional, view of an apparatus that may be employed for collecting the dust to be treated as hereinafter described.

In Fig. 1, A is a revolving kiln lined with fire brick and provided with a ring B, inside the lining, which has the effect of holding back the clinker at the discharge end of the kiln and increasing the time of exposure of the clinker to high heat. The dust-laden gases from the kiln pass down into the chamber C, in which a considerable amount of dust is deposited, and from which it is removed from time to time through doors not shown. The gases then pass upward through a boiler D, in which they generate steam power and are considerably reduced in temperature. The gases then pass to the fan F, which serves to maintain the draft of the kiln and to force the gases onward through the cyclone dust collectors G, G. By means of dampers $d$ the gases may, when desired, be carried direct to the stack E, without passing through the dust-collecting apparatus, either from the chamber C or after passing through the boiler D.

After leaving the dust collectors, the gases may be carried to a chamber with walls of fine-meshed fabric, or subjected to the action of sprays of water, or treated by other known methods to remove the last traces of dust.

Figure 2:
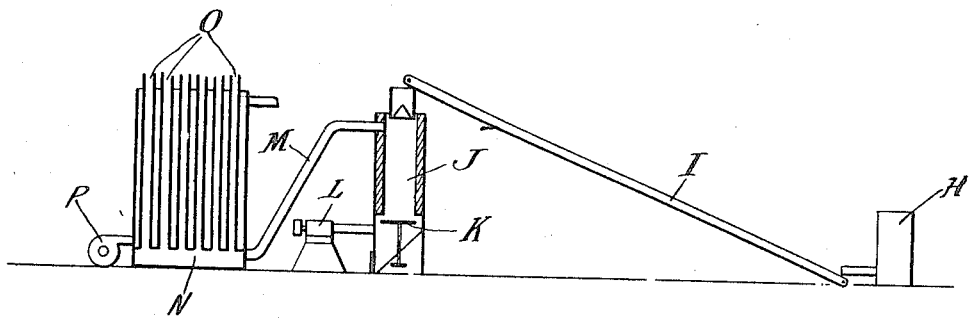
Fig. 2 illustrates a means for treating the dust.

The treatment of the dust, collected as above described or in any other manner, is illustrated in Fig. 2 and is as follows:

The dust is mixed with a small amount of water and compressed into briquets in the brick-machine H. The briquets are carried by the inclined conveyer I to the top of the vertical kiln J, into which they are introduced, with the addition of the necessary fuel, preferably crushed coke or anthracite coal, through a cup-and-cone or similar charging device. The kiln is operated by air under a pressure of 5 to 20 pounds per square inch, blown in by the positive blower L. In its descent through the burning zone of the kiln the dust is converted into cement clinker, which is discharged by the revolving plate and scraper K. During the calcination the dust gives up practically all the alkali which it contains, the liberation of the alkali being aided by the rapid current of hot gases passing up through the charge. As the material is in the form of briquets, the gases carry away practically no dust, and the volatilized alkali therefore remains in water-soluble condition. The gases carrying the alkali pass out from near the top of the kiln by the pipe M and are carried to the chamber N, from which they pass up through a large number of vertical pipes O, cooled by air from the fan P or by water circulating around the pipes. The alkali is deposited on the inside of the pipes, from which it is from time to time detached by scrapers and allowed to drop down into the chamber N; from this it is removed through doors. The gases issuing from the pipes O may be freed from the last remnants of alkali by spraying with water.

The kiln and auxiliary apparatus above described may be used for direct burning of cement mixture; in this case, however, the amount of alkalis is so small in proportion to the volume of gases evolved that the condensation of the product is much more difficult than in reburning stack dust. I prefer to carry on the process as above described, burning the cement mixture as usual in rotary kilns and thus concentrating the alkalis in a relatively small amount of dust, collecting the dust by suitable mechanical appliances, reburning the collected dust in special vertical kilns operated by forced draft, and collecting the volatilized alkalis by suitable cooling devices in comparatively pure and water-soluble form.

The clinker discharged from the vertical kiln may be separately ground to cement, or it may be added to the clinker obtained from the rotary kilns.

Having thus described the invention, what is claimed and desired to be secured by Letters Patent is:

1. The process of recovering alkalis from dust collected from rotary cement kilns by re-burning the dust in a vertical kiln operated with strong blast of high-pressure air, and condensing the alkalis in soluble form by cooling the gases from the vertical kiln.

2. The process of recovering alkalis from dust collected from rotary cement kilns by molding the dust into small blocks, re-burning the blocks of dust in a vertical kiln operated with strong blast of high-pressure air, and condensing the alkalis in soluble form by cooling the gases from the vertical kiln.

3. The process of recovering alkalis from dust collected from rotary cement kilns by molding the dust into small blocks, re-burning the blocks of dust in a vertical kiln operated with a blast of air under 5 to 20 pounds pressure, and condensing the alkalis in soluble form by cooling the gases from the vertical kiln.

In testimony whereof I affix my signature.

SPENCER B. NEWBERRY.